United States Patent [19]

Uhri

[11] Patent Number: 4,724,905
[45] Date of Patent: Feb. 16, 1988

[54] SEQUENTIAL HYDRAULIC FRACTURING
[75] Inventor: Duane C. Uhri, Grand Prairie, Tex.
[73] Assignee: Mobil Oil Corporation, New York, N.Y.
[21] Appl. No.: 907,260
[22] Filed: Sep. 15, 1986
[51] Int. Cl.⁴ ........................ E21B 43/26; E21B 49/00
[52] U.S. Cl. ................................... 166/250; 166/263; 166/308
[58] Field of Search ............... 166/250, 271, 283, 263, 166/308

[56] References Cited

U.S. PATENT DOCUMENTS

| | | | |
|---|---|---|---|
| 3,822,747 | 7/1974 | Maquite, Jr. .................. | 166/308 X |
| 3,933,205 | 1/1976 | Kiel ................................. | 166/308 |
| 4,005,750 | 2/1977 | Shuck ............................. | 166/250 X |
| 4,067,389 | 1/1978 | Savins ............................ | 166/246 |
| 4,378,845 | 4/1983 | Medlin et al. ................. | 166/297 |

Primary Examiner—George A. Suchfield
Attorney, Agent, or Firm—Alexander J. McKillop; Michael G. Gilman; Charles A. Malone

[57] ABSTRACT

A process for sequential hydraulic fracturing of a hydrocarbon fluid-bearing formation. A fracture is induced in said formation by hydraulically fracturing via one wellbore. Thereafter, while the formation remains pressurized from the first induced-fracture operation, a second hydraulic fracturing operation is conducted via another wellbore substantially within the pressurized formation area of the first fracturing operation which causes a fracture trajectory to form contrary to the far-field in-situ stresses. This second hydraulic fracture will tend to curve away from the first hydraulic fracture and has the potential of intersecting natural hydrocarbon fluid-bearing fractures in said formation.

7 Claims, 9 Drawing Figures

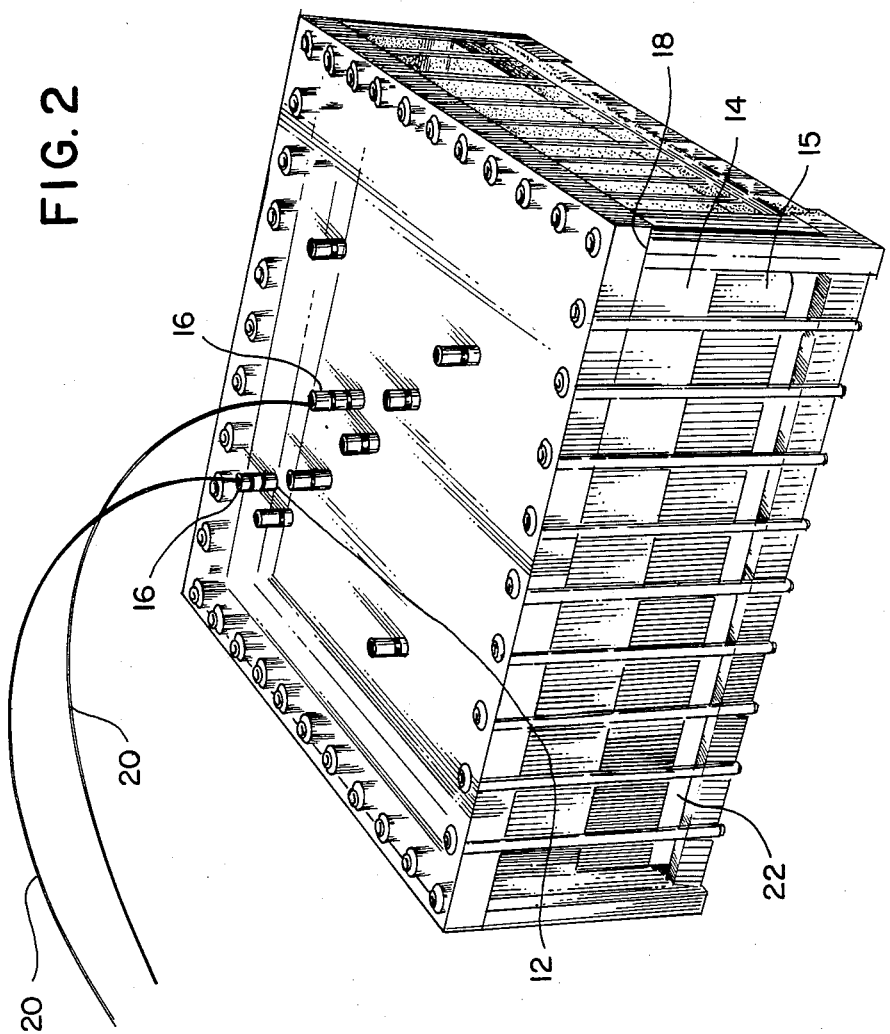

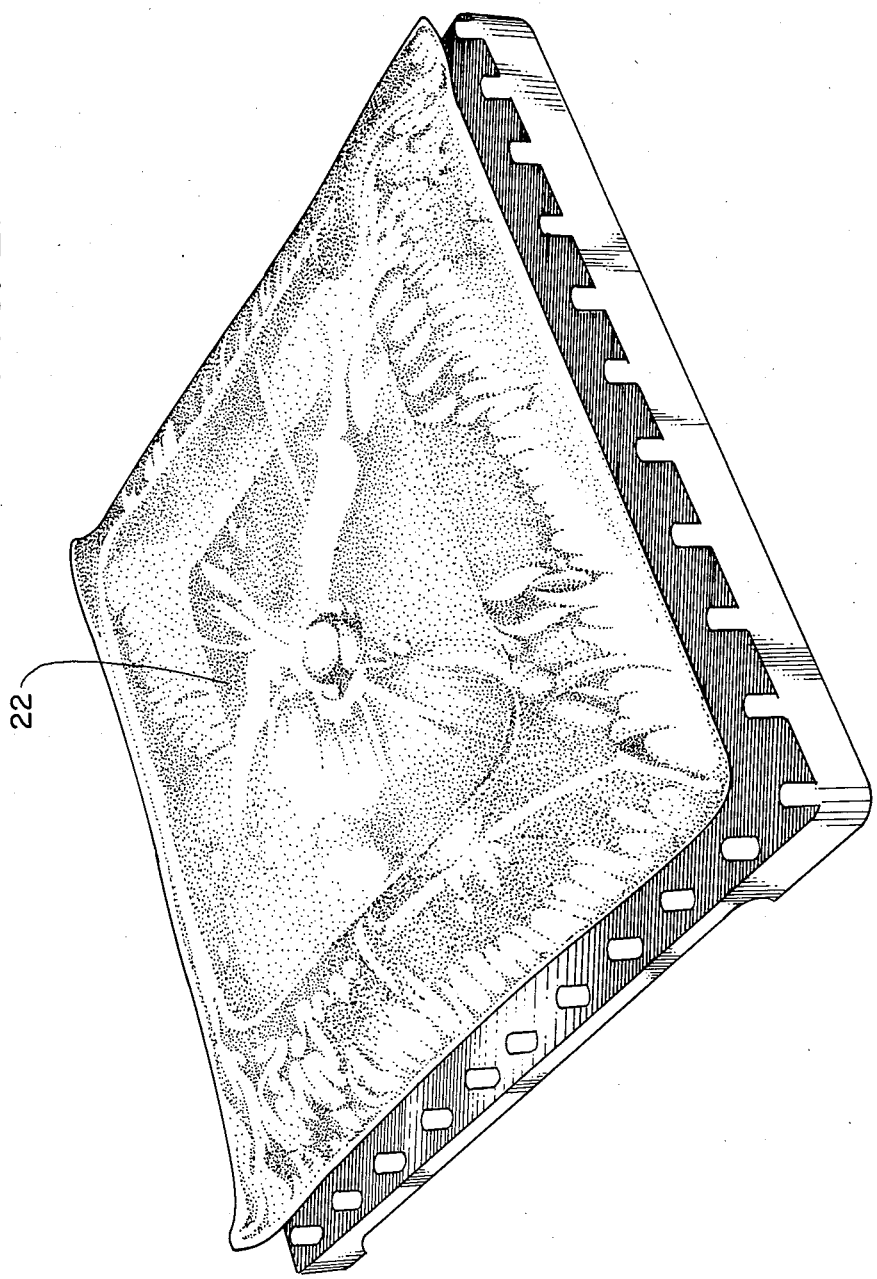

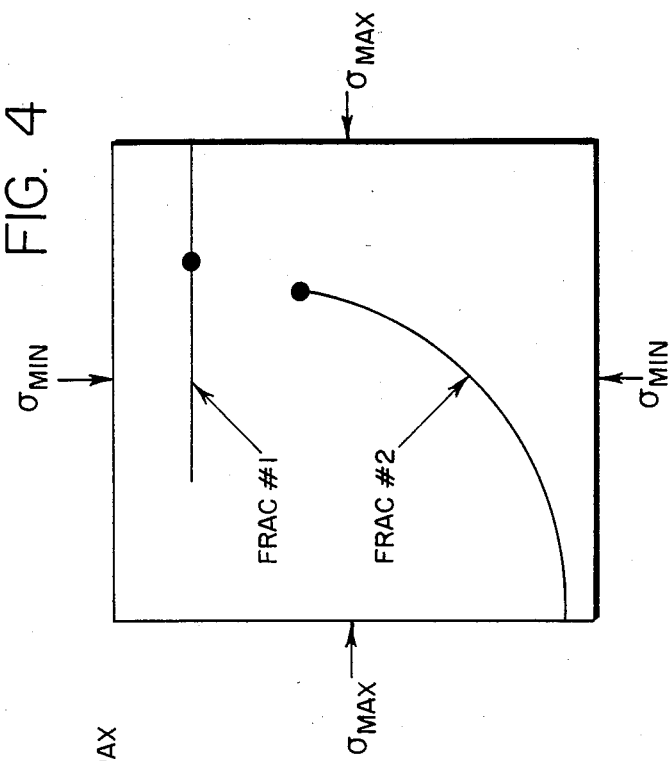
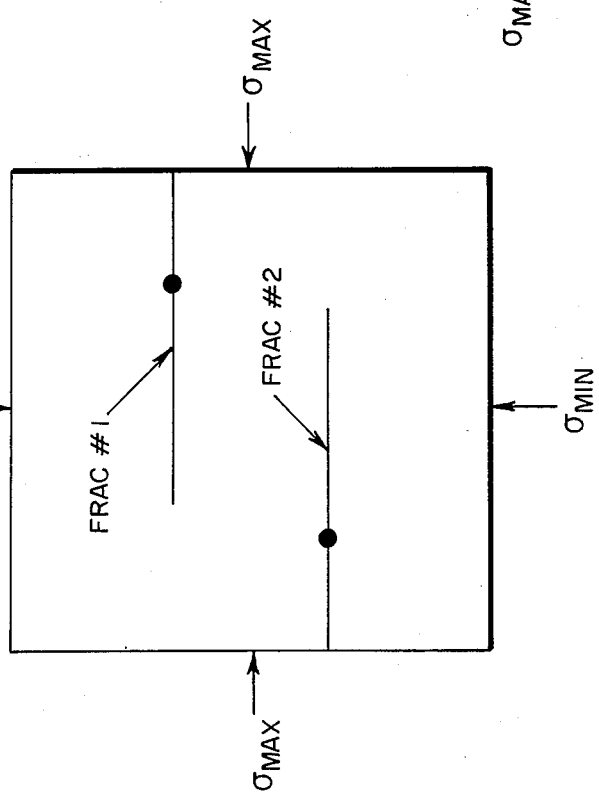

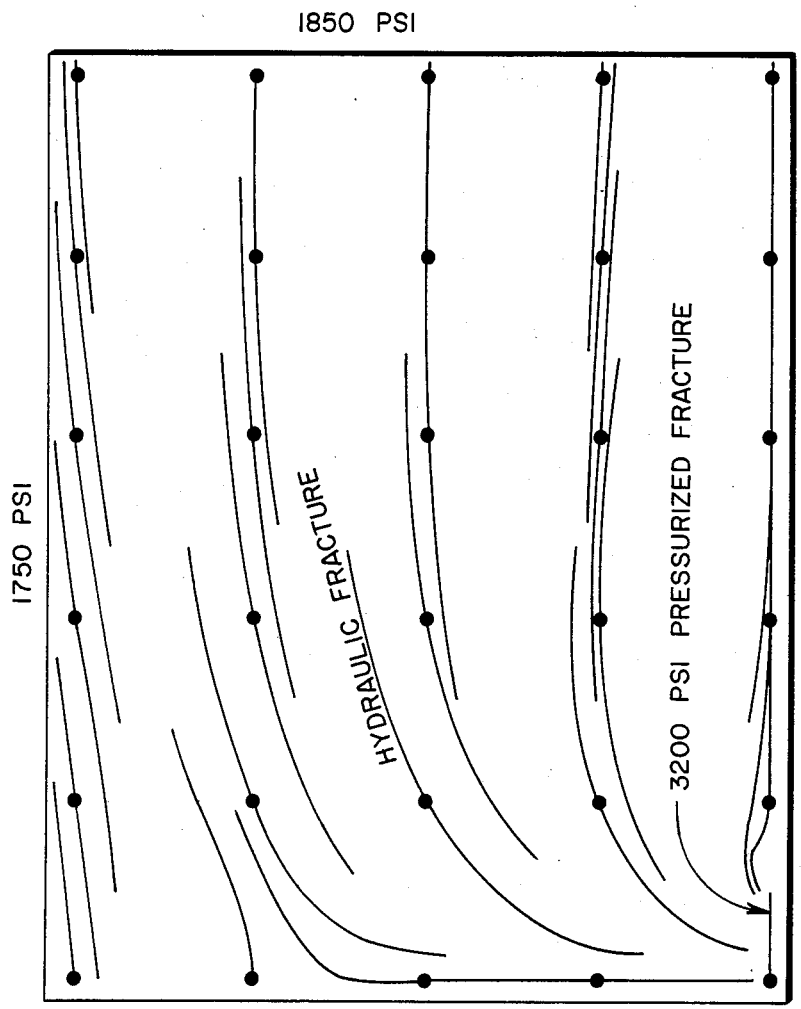

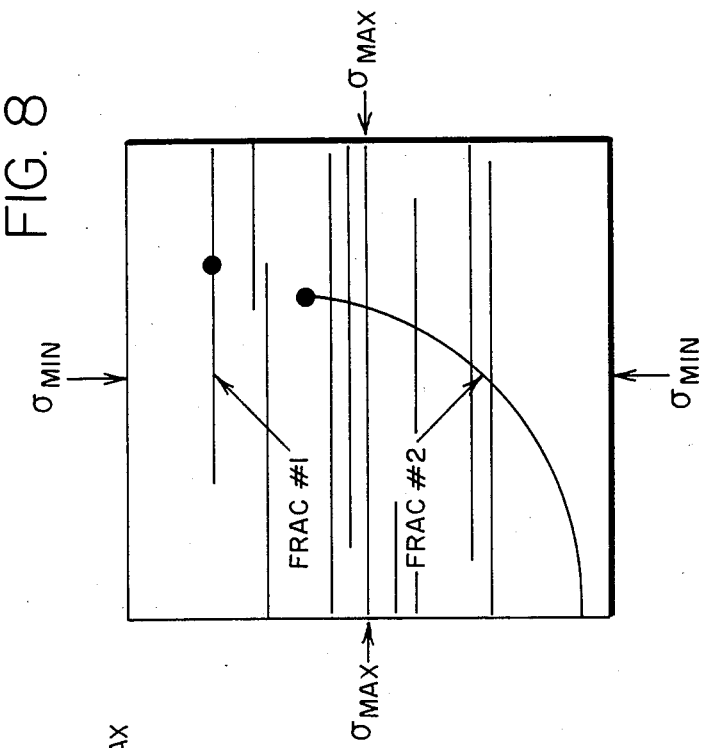
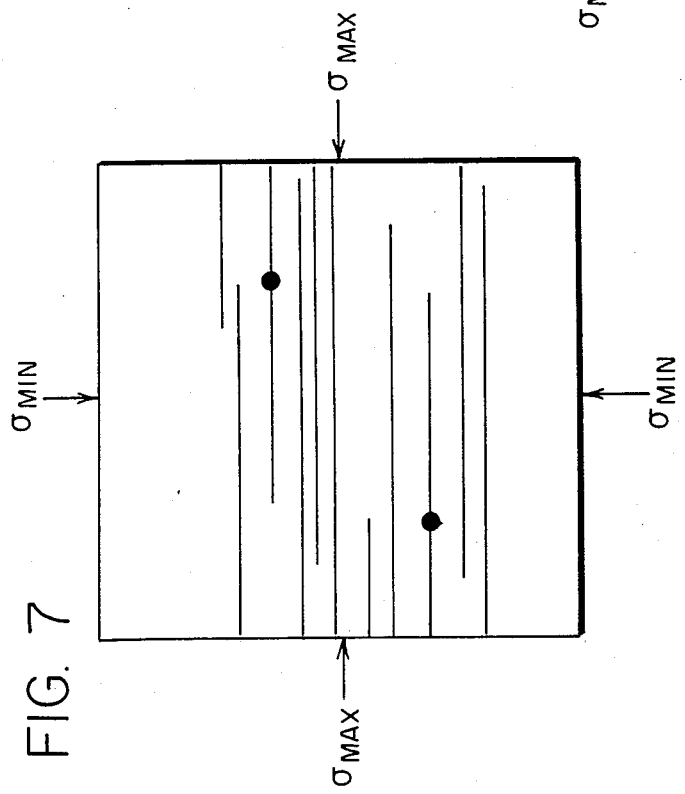

SEQUENTIAL HYDRAULIC FRACTURING

FIELD OF THE INVENTION

This invention relates to the ability to control the direction of hydraulic fracture propagation in a subsurface formation by hydraulically fracturing the formation in a sequential manner. In hydrocarbon-bearing formations, this could significantly increase well productivity and reservoir cumulative recovery, especially in naturally fractured reservoirs.

BACKGROUND OF THE INVENTION

Hydraulic fracturing is well established in the oil industry. In conventional hydraulic fracturing as practiced by industry, the direction of fracture propagation is primarily controlled by the present orientation of the subsurface ("in-situ") stresses. These stresses are usually resolved into a maximum in-situ stress and a minimum in-situ stress. These two stresses are mutually perpendicular (usually in a horizontal plane) and are assumed to be acting uniformly on a subsurface formation at a distance greatly removed from the site of a hydraulic fracturing operation (i.e., these are "far-field" in-situ stresses). The direction that a hydraulic fracture will propagate from a wellbore into a subsurface formation is perpendicular to the least principal in-situ stress.

The direction of naturally occurring fractures, on the other hand, is dictated by the stresses which existed at the time when that fracture system was developed. As in the case of hydraulic fractures, these natural fractures form perpendicular to the least principal in-situ stress. Since most of these natural fractures in a given system are usually affected by the same in-situ stresses, they tend to be parallel to each other. Very often, the orientation of the in-situ stress system that existed when the natural fractures were formed coincides with the present-day in-situ stress system. This presents a problem when conventional hydraulic fracturing is employed.

When the two stress systems have the same orientation, any induced hydraulic fracture will tend to propagate parallel to the natural fractures. This results in only poor communication between the wellbore and the natural fracture system and does not provide for optimum drainage of reservoir hydrocarbons.

Therefore, what is needed is a method whereby the direction of hydraulic fracture propagation can be controlled so as to cut into a natural fracture system and link it to the wellbore in order to increase hydrocarbon productivity and cumulative recovery. This means that the in-situ stress field has to be altered locally in an appropriate manner.

SUMMARY OF THE INVENTION

This invention is directed to a method for the sequential hydraulic fracturing of a hydrocarbon-bearing formation penetrated by two closely-spaced wells. In sequential hydraulic fracturing, the direction that a hydraulic fracture will propagate is controlled by altering the local in-situ stress distribution in the vicinity of the first wellbore. By this method, a hydraulic fracturing operation is conducted at the first wellbore wherein a hydraulic pressure is applied to the formation sufficient to cause a hydraulic fracture to form perpendicular to the least principal in-situ stress.

While maintaining pressure in this first hydraulic fracture, a second hydraulic fracture is initiated in the second wellbore. This second hydraulic fracture, due to the alteration of the local in-situ stresses by the first hydraulic fracture will initiate at an angle, possibly perpendicular, to the first hydraulic fracture. In propagating, this second hydraulic fracture then has the potential of intersecting natural fractures not contacted by the first hydraulic fracture, thereby significantly improving the potential for enhanced hydrocarbon production and cumulative recovery.

The method is applied to the second wellbore sufficient to cause the second hydraulic fracture to intersect at least one hydrocarbon-bearing natural fracture. Thereafter, pressure is released in both the first and second hydraulic fractures and hydrocarbons are produced from the formation.

It is therefore an object of this invention to locally alter in-situ stress conditions and control the direction that a hydraulic fracture will propagate.

It is another object of this invention to locally alter in-situ stress conditions and generate hydraulic fractures which will cut into a natural fracture system and connect it to the wellbore.

It is yet another object of this invention to increase hydrocarbon production from a subsurface hydrocarbon-bearing formation.

It is still yet a further object of this invention to obtain more effective hydraulic fracturing results under different subsurface in-situ stress conditions.

BRIEF DESCRIPTION OF THE DRAWINGS

FIG. 2 is a view of a low-pressure triaxial stress frame wherein a plymer block is deployed.

FIG. 2A is a view of the pressurized bladder which rests in the bottom of the triaxial stress frame wherein the polymer block is deployed.

FIG. 3 depicts the results of physically modelling the generation of two non-interacting hydraulic fractures in a triaxial stress field.

FIG. 4 illustrates the results of physcially modelling the sequential hydraulic fracturing of a well-pair in a triaxial stress field.

FIG. 6 shows theoretical hydraulic fractures that might form in a biaxial stress field that is influenced by a pressurized fracture where higher pressure is employed in the pressurized fracture.

FIG. 7 illustrates conventional non-interacting hydraulic fracturing in a naturally fractured reservoir.

FIG. 8 depicts sequential hydraulic fracturing in a naturally fractured reservoir.

DESCRIPTION OF THE PREFERRED EMBODIMENTS

Figure 1:
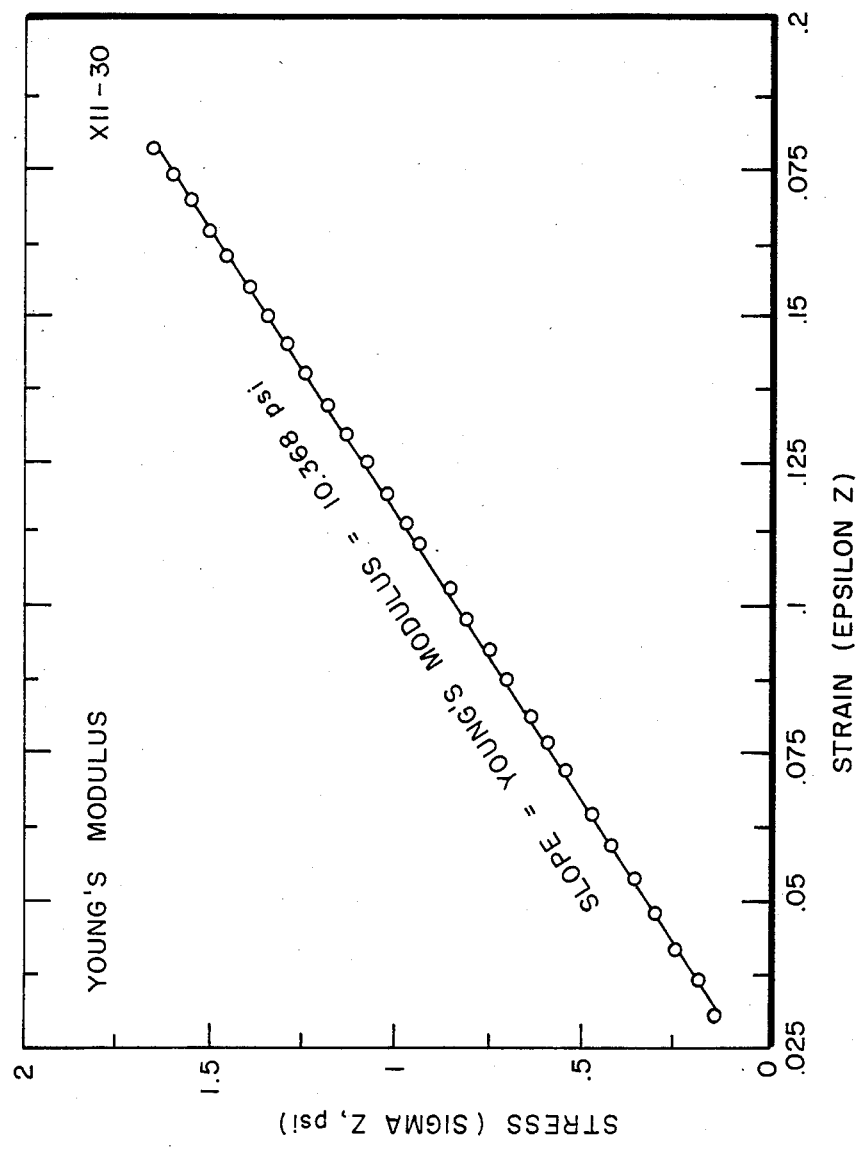
FIG. 1 is a graph of stress versus strain used in the determination of Young's modulus for a polymer specimen.

In the practice of this invention, hydraulic fracturing is initiated at one well in a formation containing two closely-spaced wells. A hydraulic fracturing technique is discussed in U.S. Pat. No. 4,067,389, issued to Savins on Jan. 10, 1978. This patent is hereby incorporated by reference. Another method for initiating hydraulic fracturing is disclosed by Medlin et al. in U.S. Pat. No. 4,378,845 which issued on Apr. 5, 1983. This patent is also incorporated by reference. As is known to those skilled in the art, in order to initiate hydraulic fracturing in the formation, the hydraulic pressure applied must exceed the formation pressures in order to cause a fracture to form. The fracture which forms will generally run perpendicular to the least principal stress in the formation or reservoir.

Natural fractures also form perpendicular to the least principal in-situ stress. However, the natural fracture "trend" is dictated by the geological stresses that were in existence at the time the natural fractures were formed. The orientations of these geological stresses often coincide with the orientations of the present-day subsurface in-situ stresses. In these cases, the result is that a hydraulically induced fracture will tend to assume an orientation that is parallel to that of the natural fracture system.

Factors influencing in-situ stress changes due to hydraulic fracturing are fracture loading, pressure changes, and temperature changes. These factors are discussed in an article entitled "Analysis and Implications of In-Situ Stress Changes During Steam Stimulation of Cold Lake Oil Sands." This article was published by the Society of Petroleum Engineers and was authored by S. K. Wong. This paper was presented at the Rocky Mountain Regional Meeting of the Society of Petroleum Engineers held in Billings, MT, May 19-21, 1986.

This invention utilizes the in-situ stress changes due to hydraulic fracturing in one well to control the direction of propagation of a second hydraulic fracture in a second well located nearby the first well. Upon applying a pressure in the first well sufficient to hydraulically fracture the reservoir, the hydraulic pressure is maintained on the formation. This first hydraulic fracture forms parallel to the fractures in the natural fracture system. While maintaining the hydraulic pressure on the formation in the first well, another hydraulic fracturing operation is conducted at a second well within the zone of in-situ stress alteration due to the first hydraulic fracture. Pressure is then applied via the second well sufficient to cause a second hydraulically induced fracture to form in said formation. This second hydraulic fracture initiates at an angle, often perpendicular, to the first hydraulic fracture and curves away from the first hydraulic fracture as it propagates. This second hydraulic fracture intersects at least one natural hydrocarbon fluid-bearing fracture. Thereafter, the pressures are relieved in both wells and hydrocarbon fluids are produced therefrom.

It has been demonstrated through laboratory experiments that the second hydraulic fracture does, in fact, curve away from the hydraulic fracture resultant from the first fracturing operation. Curving in this manner, the second hydraulic fracture intersects natural fractures and connects them to the second well. Both low-pressure and high-pressure experiments were conducted to verify this sequential hydraulic fracturing method. A transparent low-pressure triaxial stress frame was used for hydraulic fracturing studies with polymers as "rock" specimens. A high-pressure polyaxial test cell was used to confirm the low-pressure results in synthetic rock at realistic subsurface in-situ stress conditions.

In order to conduct the low-pressure experiments, it was necessary to develop a modelling medium. The modelling medium selected was Halliburton's "K-Trol" polyacrylamide polymer. Different strengths and properties can be obtained by varying the amounts of monomer and cross-linker that are used in the polymer. "K-Trol" sets up by an exothermic reaction. This polymer can be fractured hydraulically and the more rigid formulations showed photoelastic stress patterns under polarized light. It was further determined that the material was linear elastic (i.e., a plot of stress versus strain is a straight line, as shown in FIG. 1). The polymer showed essentially no stress hysteresis, and behaved in a manner similar to rock (e.g., crushes like rock). The main advantages of using this polymer are (a) the material is moldable (in layers when necessary to represent geological model situations), (b) it is transparent so that what is taking place can be observed as it happens, (c) pressures necessary for stressing the model are very low (a few psi), (d) large models can be constructed to minimize edge effects and to accommodate multi-well arrays, and (e) media over a broad range of rigidities can be readily formulated.

A polymer block was molded in a substantially well-oiled Plexiglas mold with an oil layer floated on top of the polymerizing fluid. The polymer block was formed in three layers. The layer to be hydraulically fractured was usually about 2 inches thick and sandwiched between two ¼ inch layers of a less rigid polymer composition. The reason for this was to contain the fracture within the thicker layer and prevent the fracturing fluid from escaping elsewhere in the model system.

Each polymer layer required approximately 1 to 2 hours to set up sufficiently before another layer could be added. Additional layers were poured directly through the protective oil layer and became bonded to the underlying layer upon polymerizing. The time required for full-strength polymerization is about 24 hours.

A Plexiglas stress frame as shown in FIGS. 2 and 2A was used to stress the polymer block triaxially (i.e., three mutually perpendicular stresses of different magnitudes). This frame has internal dimensions of about $14 \times 14 \times 5$ inches and is constructed of 1 inch thick Plexiglas of substantially good optical quality.

The polymer test block was stressed in the following manner. First, the test block was molded so that its dimensions were less than those of the stress frame. The dimensions of the test block are dictated by the Young's modulus of the polymer formulation being stressed and the desired magnitudes of the boundary stresses. A representation of the determination of Young's modulus from a plot of stress versus strain is depicted in FIG. 1. When the stress frame is loaded uniaxially, triaxial stresses are obtained due to deformation of the polymer block and its interaction with the walls of the stress frame. As a load is applied to one set of faces of the polymer bloc, the block will begin to deform. At some point, a second set of faces will come into contact with the walls of the stress frame and start building up pressure against these walls. Later, after futher deformation, the third set of faces will touch the remaining walls and start building up pressure there. The result is triaxial stress obtained from uniaxial loading.

In this stress frame, the load is applied by means of a pressurized bladder 22 as shown in FIGS. 2 and 2A. Both water and air are used to pressure up the bladder. This bladder is made of 8 mil vinyl that was cut and heat sealed into form. A Plexiglas plate 15 above the bladder transmits the load (usually less than 2 psi) to the polymer block 14.

To determine the magnitudes and/or ratios of the stresses obtained following this procedure, a theory for finite stress-strain relationships was developed. Widely published conventional infinitesimal stress-strain relationships were found not to be valid since the strains observed were by no means infinitesimal. A computer program was written to calculate what the dimensions of the polymer block should be so as to provide specified triaxial stress ratios when loaded uniaxially. The theory and the computer program provide for the finite stress-strain relationships for an incompressible linear elastic deformable homogeneous isotropic medium.

Oil is the principal fracturing fluid utilized. Oil was selected because it does not penetrate into the polymer block and is easily dyed with the oil-based dye "Oil Red-O".

The fracturing fluid is injected into the polymer block via "wellbores" 12 through the top 18 of the triaxial stress frame in FIG. 2. These "wellbores" are lengths of stainless steel hypodermic tubing that are set in place after the polymer block 14 is stressed. They are secured in position with Swage-lock fittings 16 mounted in the top of the stress frame as shown in FIG. 2. Plastic tubing 20 connects these fittings to small laboratory peristaltic pumps (not shown) which provide the fracturing fluid pressures.

Experiments were conducted in this transparent triaxial test cell to simulate hydraulic fracturing in a natural formation. Both non-interacting hydraulic fractures and sequential hydraulic fractures were generated. Non-interacting hydraulic fracturing is defined to mean the process of creating a fracture and releasing the pressure in the fracture prior to the initiation of a subsequent fracture as is common practice to those skilled in the art. Sequential hydraulic fracturing is defined to mean the technique whereby a new hydraulic fracture is created or an existing fracture is pressurized, held at a stabilized pressure, and another hydraulic fracture is initiated in a nearby wellbore.

In order to predict and/or explain hydraulic fracturing behavior associated with these experiments, a theory for sequential hydraulic fracturing was developed. This theory is based on the superposition of work by M. Greenspan, "Effect of a Small Hole on the Stresses in a Uniformly Loaded Plate," Quarterly Appl. Math., Vol. 2 (1944) 60–71; and by I. N. Sneddon and H. A. Elliott, "The Opening of a Griffith Crack Under Internal Pressure," Quarterly Appl. Mat., Vol. 3 (1945) 262–267.

Experimental results for fracturing response in the case of non-interacting hydraulic fractures were evaluated. It was demonstrated that, in the absence of local alterations in the in-situ stress field, hydraulic fractures are controlled by the "far-field" in-situ stresses. According to theory, all non-interacting hydraulic fractures should be parallel to each other and perpendicular to the least principal in-situ stress. FIG. 3 depicts two wells that have been hydraulically fractured under conditions of non-interaction of the hydraulic fractures as in the case of conventional hydraulic fracturing. The far-field stresses $\sigma_{max}$ and $\sigma_{min}$ represent the maximum and minimum principal horizontal stresses respectively. This same type of phenomenon was observed in the physical modelling experiments using the transparent polymer in the low-pressure triaxial stress frame and demonstrates that the triaxial stress frame performs as predicted.

FIG. 4 illustrates the results of sequential hydraulic fracturing in the low-pressure triaxial stress frame. In this, fracture #1 was initiated first. It propagated perpendicular to the least principal in-situ stress as indicated. While pressure was maintained on fracture #1, fracture #2 was initiated and propagated. Due to the alteration of the local in-situ stress field by fracture #1, fracture #2 curved away from fracture #1 in a manner similar to that shown in FIG. 4.

Sequential hydraulic fracturing was also performed in a high-pressure polyaxial test cell in synthetic rock subjected to realistic subsurface in-situ stress conditions. A 1.5 cubic foot block of porous, mechanically rock-like material ("Hydrostone") was subjected to an "overburden" stress of 2400 psi and horizontal stresses of 1100 psi in one direction and 1300 psi in the perpendicular direction. Two ⅛ inch stainless steel tubing "wells" were placed in the block and the block was hydraulically fractured in a sequential manner. The first hydraulic fracture formed perpendicular to the least principal stress (i.e., perpendicular to the 1100 psi stress). The second, sequential hydraulic fracture propagated perpendicular to the first hydraulic fracture.

Figure 5:
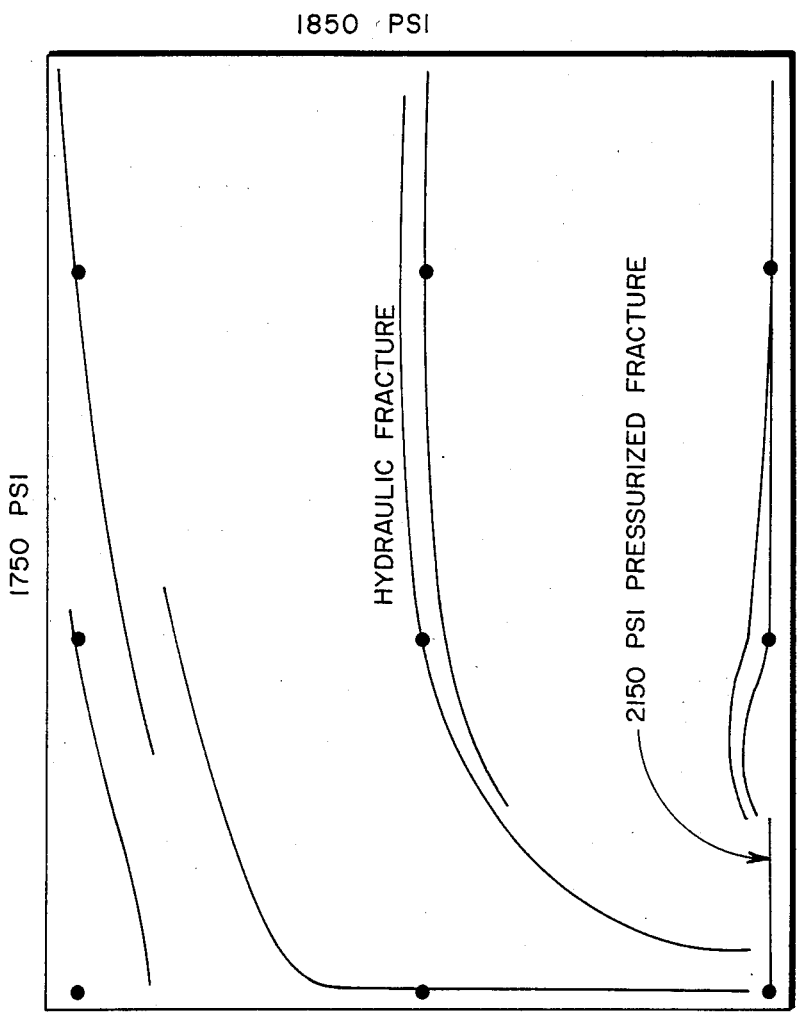
FIG. 5 shows theoretical hydraulic fractures that might form in a biaxial stress field that is influenced by a pressurized fracture.

FIG. 5 shows theoretical hydraulic fractures that might form in a biaxial stress field that is influenced by a pressurized fracture. Due to symmetry of the problem, this figure represents only one quadrant of the full picture. If it is assumed that there is a 10 acre well spacing, 2150 psi in the first fracture, and that other induced hydraulic fractures will tend to have equal wings up to a maximum of 900 feet, the results shown in FIG. 5 are obtained. The importance of the location of the wellbore for the second hydraulic fracture is related to the length of and the pressure in the first hydraulic fracture of the sequential fracturing well-pair. The greater the length of or the greater the pressure in this first fracture, the further away the effects can be felt. If the pressure in the first fracture is 3200 psi instead of 2150 psi, the result will be that of FIG. 6. As is shown, in this case there is significant interaction up to three well locations away. These results from theoretical analysis demonstrate that there is sufficient interaction between sequentially created and propagated fractures to produce significant changes in hydraulic fracture trajectories. As is shown, the second fracture in such a set will usually be curved.

FIG. 7 illustrates conventional non-interacting hydraulic fracturing in a naturally fractured reservoir. In this case, the hydraulic fractures are parallel to the natural fractures. FIG. 8 depicts sequential hydraulic fracturing in a naturally fractured reservoir. This shows that, when the second fracture is initiated and propagated sequentially, it will tend to curve away from the first hydraulic fracture, cut into the natural fracture system, and link it to the wellbore.

From the preceding experiments and theoretical analysis, it is shown that the proper design and interpretation of physical modelling studies would enable the industry to not only save on expenditures associated with fracturing treatments, but also to actually create significant additional sources of revenue. As much as a million gallons of expensive fracturing fluid is used in some treatments. Poorly designed fracture treatments may result in fractures which stray into unproductive formations, thereby wasting the fracturing fluid or watering-out the well.

In the foregoing, it has been demonstrated that fracture propagation direction can be altered. By hydraulically fracturing paired-wells sequentially, fractures can be made to grow in a direction contrary to what would be expected under natural in-situ stress conditions. In sequential hydraulic fracturing, the second fracture tends to curve away from the first hydraulic fracture.

As will be apparent to those skilled in the art, these demonstrations have applications to hydraulic fracturing in naturally fractured reservoirs.

Obviously, many other variations and modifications of this invention, as previously set forth, may be made without departing from the spirit and scope of this invention as those skilled in the art will readily understand. Such variations and modifications are considered part of this invention and within the purview and scope of the appended claims.

I claim:

1. A process for predicting hydraulic fracturing trajectories in a natural hydrocarbon fluid bearing formation whereby utilizing uniaxial stress, a force can be generated sufficient to cause triaxial stress in a model comprising:
   (a) placing within a triaxial stress frame, a solid polymer test block whose dimensions are determined by Young's modulus of the polymer being stressed and the desired magnitudes of the boundary stresses;
   (b) placing at the bottom of said block, an inflatable bladder separated from said block by a solid sheet of thermoplastic polymer which sheet is sufficient to withstand stresses generated within said frame;
   (c) confining said test block, said bladder, and said solid sheet with sheets of a thermoplastic polymer of a strength sufficient to allow stressing of said block by triaxial forces;
   (d) directing simulated wellbores through the top thermoplastic and into said test block in a manner sufficient to permit injection of a liquid into said test block;
   (e) applying uniaxial stress to said test block which causes triaxial stresses to be exerted through said stress frame in an amount sufficient to simulate stresses expected to be encountered in a natural hydrocarbon fluid-bearing formation;
   (f) injecting into one wellbore, a liquid under pressure sufficient to create a hydraulic fracture in said test block;
   (g) maintaining triaxial stresses on said test block and maintaining pressure in said hydraulic fracture;
   (h) injecting into another wellbore, a liquid under pressure sufficient to create another hydraulic fracture in said test block which fracture curves away fom the previous said hydraulic fracture; and
   (i) predicting from the observed fracture patterns of said test block the manner by which hydraulic fracture trajectories can be controlled by locally altering an in-situ stress field.

2. The process as recited in claim 1 where in step (a) said test block comprises a polyacrylamide polymer of about 2 to 4 inches thick.

3. The process as recited in claim 1 where in step (b) said bladder comprises vinyl of about 8 mil in thickness which is cut and heat sealed to the shape of the test frame and is able to withstand a pressure of about 2 psi.

4. The method as recited in claim 1 where in step (b) said solid sheet comprises a poly-(methyl methacrylate) type polymer of about 1 inch in thickness.

5. The process as recited in claim 1 where the thermoplastic polymer sheet in step (c) comprises poly-(methyl methacrylate) type polymer of a thickness of about 1 inch.

6. The process as recited in claim 1 where in step (d) said wellbores each comprise stainless steel hypodermic tubing.

7. The process as recited in claim 1 where in step (f) the liquid comprises a dyed oil.

* * * * *

UNITED STATES PATENT AND TRADEMARK OFFICE
CERTIFICATE OF CORRECTION

PATENT NO. : 4,724,905
DATED : February 16, 1988
INVENTOR(S) : Duane C. Uhri

It is certified that error appears in the above-identified patent and that said Letters Patent is hereby corrected as shown below:

Column 2, line 34, "plymer" should be --polymer--.

Column 4, line 52, "bloc" should be --block--.

Column 4, line 55, "futher" should be --further--.

Column 8, line 11, "fom" should be --from--.

Signed and Sealed this

Ninth Day of August, 1988

Attest:

DONALD J. QUIGG

*Attesting Officer*  *Commissioner of Patents and Trademarks*